United States Patent [19]
Hayashida

[11] Patent Number: 5,883,312
[45] Date of Patent: Mar. 16, 1999

[54] MAGNETOSTRICTIVE SENSOR STRUCTURE

[75] Inventor: Tatsuaki Hayashida, Tokyo, Japan

[73] Assignee: Mitsubishi Jidosha Kogyo Kabushiki Kaisha, Tokyo, Japan

[21] Appl. No.: 849,147

[22] PCT Filed: Sep. 27, 1996

[86] PCT No.: PCT/JP96/02795

§ 371 Date: May 27, 1997

§ 102(e) Date: May 27, 1997

[87] PCT Pub. No.: WO97/12213

PCT Pub. Date: Apr. 3, 1997

[30] Foreign Application Priority Data

Sep. 27, 1995 [JP] Japan .................................. 7-273512

[51] Int. Cl.[6] .............................. G01L 5/00; G01L 1/12
[52] U.S. Cl. .................................. 73/862.69; 73/862.333
[58] Field of Search ........................ 73/862.69, 862.333, 73/862.335

[56] References Cited

U.S. PATENT DOCUMENTS

| 3,664,187 | 5/1972 | Coransson | 73/862.69 |
|---|---|---|---|
| 3,903,739 | 9/1975 | Kolavcic | 73/862.69 |
| 4,088,013 | 5/1978 | Dahle et al. | 73/869.69 |
| 4,474,069 | 10/1984 | Blomkvist et al. | 73/862.69 |

FOREIGN PATENT DOCUMENTS

| 1220634 | 7/1966 | Germany | 73/862.69 |
|---|---|---|---|
| 989641A | 4/1997 | Japan . | |
| 989642A | 4/1997 | Japan . | |
| 0267134 | 4/1970 | U.S.S.R. | 73/862.69 |
| 0777491 | 11/1980 | U.S.S.R. | 73/862.69 |
| 1173209 | 8/1985 | U.S.S.R. | 73/862.69 |

*Primary Examiner*—Max H. Noori

[57] ABSTRACT

Drawing two virtual lines passing through the center of a rectangular thin plate, made of a ferromagnetic material such as a permalloy, in directions deflected 45 degrees to the right and left relative to the horizontal/vertical lines, right, left, upper and lower edge areas between the two virtual lines of the thin plate are cut out to form notches. Edges of the notches do not contact the virtual lines. A coil wire is wound utilizing bottom lines of the individual pairs of opposing notches across the center to form an excitation coil and an output coil. With this construction, coil winding can be easily achieved by a robot rather than manually. This thereby considerably reduces the production cost and provides improved product quality and measurement accuracy.

20 Claims, 10 Drawing Sheets

Magnetic flux distribution

Fig. 11

Magnetic flux distribution

PRIOR ART

MAGNETOSTRICTIVE SENSOR STRUCTURE

TECHNICAL FIELD

This invention relates to a magnetostrictive sensor structure, and more specifically to one which is incorporated in a load measuring apparatus for a vehicle.

BACKGROUND ART

Figure 9:
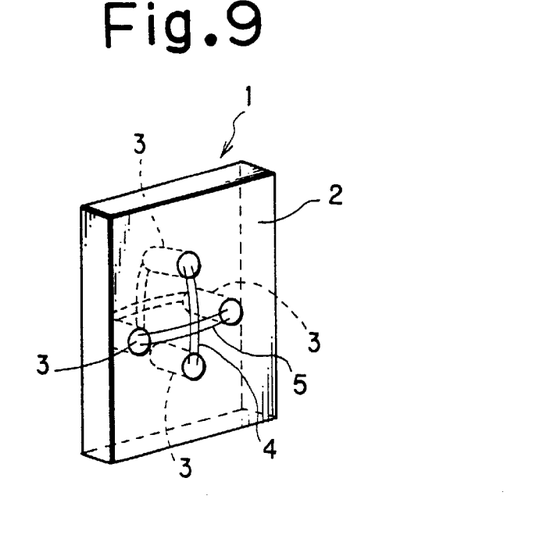
FIG. 9 is a schematic perspective view showing the basic concept of the magnetostrictive sensor structure.

Heretofore, in a magnetostrictive sensor structure 1, as shown in FIG. 9, a thin plate 2 made of a ferromagnetic material (magnetostrictive material) such as permalloy is provided with four small holes 3, arranged in cross directions coil wires are passed through the holes 3 in vertical and horizontal directions to form an excitation coil 4 and an output coil 5, located perpendicular to each other and 45 degrees from a force application direction.

Figure 10:
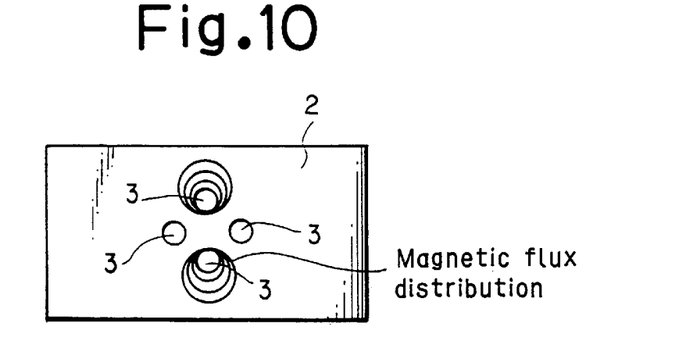
FIG. 10 is a magnetic flux distribution diagram when no shearing force is applied.

When no force is applied to the thin plate 2, as shown in FIG. 10, magnetic flux distribution direction of the excitation coil 4 is parallel to the winding direction of the output coil 5; no coupling is present between the excitation coil 4 and the output coil 5; and a gain voltage (output voltage from the output coil 5) does not change.

Figure 11:
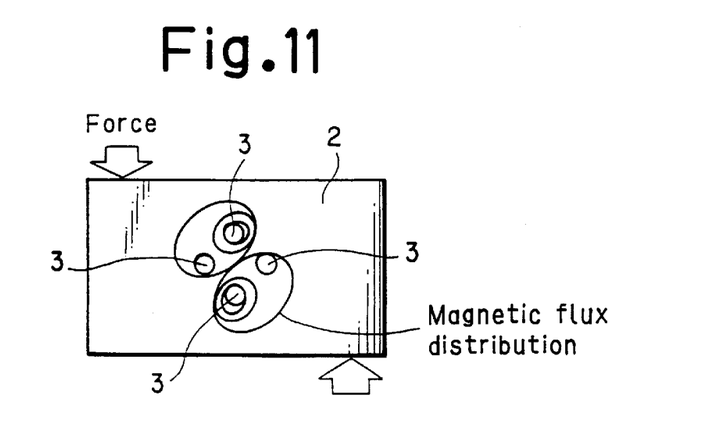
FIG. 11 is a magnetic flux distribution diagram when a shearing force is applied.

On the other hand, as shown in FIG. 11, when a force is applied to the thin plate 2, the permeability decreases in the force applying direction (because a tensile stress is generated) and increases in the perpendicular direction (because a compressive stress is generated), and magnetic flux distribution of the excitation coil 4 changes in a 45-degree direction.

Consequently, part of the changed magnetic flux distribution crosses the output coil 5 to induce a voltage proportional to the applied force from the output coil 5, whereby the voltage can be utilized to obtain, for example, an output signal for load detection.

Figure 12:
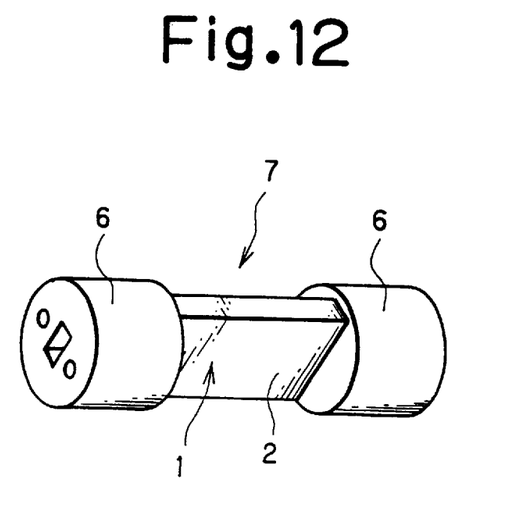
FIG. 12 is a schematic perspective view showing a magnetostrictive sensor inserted in a hole bored in the shaft applied with a load of the vehicle.

The magnetostrictive sensor structure 1, as shown in FIG. 12, for example, is welded with cylindrical bodies 6 at both sides of the thin plate 2 so as to form a magnetostrictive sensor 7. The magnetostrictive sensor 7 is engaged at a desired measured location through the cylindrical bodies 6.

Recently, to prevent large-sized vehicles such as trucks from being overloaded, it was considered that a load measuring apparatus equipped with the magnetostrictive sensor 7 be incorporated directly in the vehicle itself so that the driver or the transportation business could easily determine the load weight.

Figure 13:
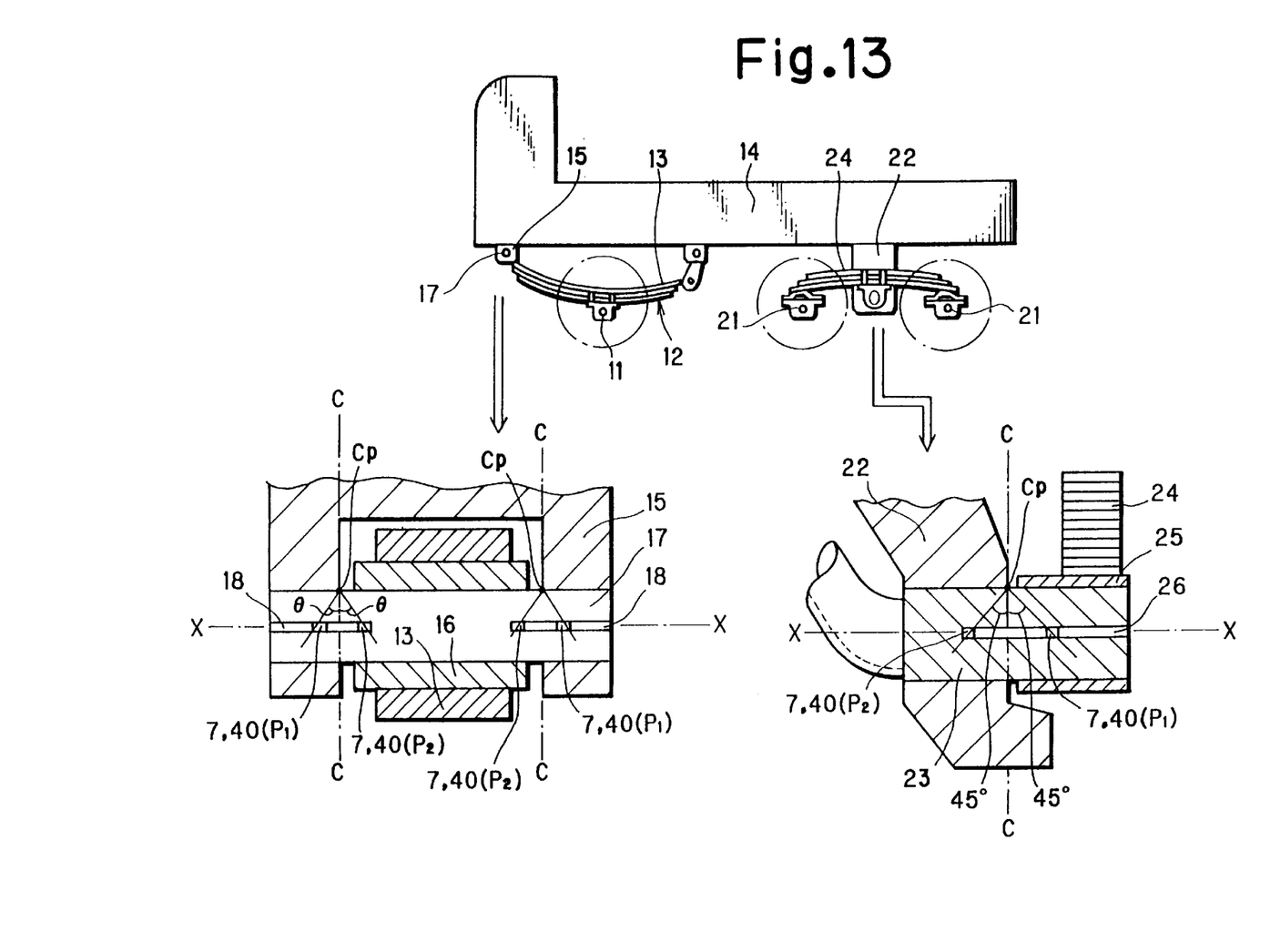
FIG. 13 is a schematic view for explaining a layout example of the magnetostrictive sensor incorporated in a truck of tandem axle structure.

For example, Japanese Patent Applications 07-273492, 07-273524, and the like applied by the present applicant proposed a construction as shown in FIG. 13.

This construction incorporates a load measuring apparatus comprising the magnetostrictive sensor 7 on a truck using a so-called tandem axle structure which has a suspension structure using a leaf spring and two axles provided at the rear axle side to reduce pressure to the road surface.

At the front axle 11 side, a leaf spring 13 of a suspension 12 of the vehicle and a bracket 15 at the bed frame 14 side are linked by a shackle pin 17 through a bushing 16; a shaft hole 18 is provided along the axial direction on the center line of the shackle pin; and the magnetostrictive sensor 7 having the magnetostrictive sensor structure 1 is engaged in this shaft hole 18.

At the rear axle 21 side, a trunnion bracket 22 mounted to the bed frame 14 is engaged with a trunnion shaft 23, and the trunnion shaft 23 is supported on a spring seat 25 of a leaf spring 24. A shaft hole 26 is provided on the center line of the trunnion shaft 23 along the axial direction, and a magnetostrictive sensor 7 having the magnetostrictive sensor structure 1 is placed in the shaft hole 26.

A strain of the shackle pin 17 due to a load at the front axle 11 side is detected by the magnetostrictive sensor structure 1, and a strain of the trunnion shaft 23 deformed in proportion to the sprung weight of the vehicle at the rear axle 21 side is detected by the magnetostrictive sensor structure 1. Then, these detection signals of the magnetostrictive sensor structure 1 are summed to obtain the vehicle sprung weight, and a calculation is made such as addition of the unsprung weight and the like to measure the load weight.

Since such a vehicle load measuring apparatus is subjected to the vehicle load such as the shackle pin 17 and the trunnion shaft 23 and vibration, and the magnetostrictive sensor 7 is inserted and engaged in a large-diameter shaft having a high strength, a strain received by the magnetostrictive sensor structure 1 of the magnetostrictive sensor 7 is as small as several $\mu$m.

Figure 3:
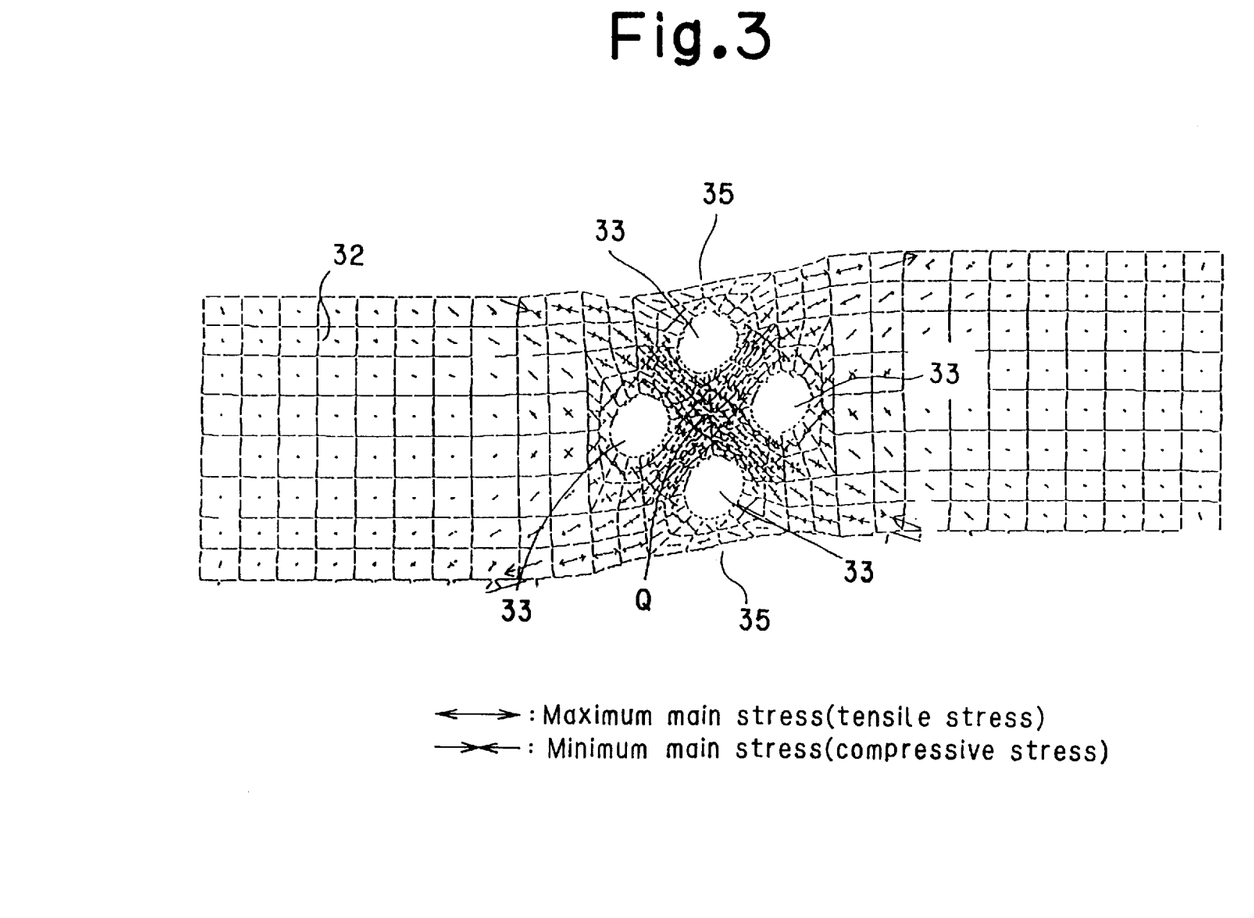
FIG. 3 is a main stress distribution diagram of the thin plate of the first aspect shown in FIG. 1 when a shearing force is applied in a direction shown by the arrow, measured by a finite element analysis method using a computer.

Therefore, in order to efficiently detect a small strain in the magnetostrictive sensor 7 used in the vehicle load measuring apparatus, the magnetostrictive sensor structure is practically structured as shown in FIG. 3.

Specifically, four small coil insertion holes 3 are provided in cross directions at the center of the rectangular thin plate 2 comprising a magnetostrictive material, and U-formed cutouts 8 are provided at the right and left sides of the outside of the position of the hole 3 of the upper line and lower line of the rectangular thin plate 2.

However, even with the U-formed cutouts 8, a very small deformation of several to 10 and some $\mu$m generated in the large-diameter shaft such as the shackle pin 17 or the trunnion shaft 23 cannot be efficiently detected, thus producing various problems in terms of the sensitivity, accuracy, and stability.

Further, in the magnetostrictive sensor structure 1, coil wires must be inserted and wound in the four holes 3 provided in cross directions to form the excitation coil 4 and the output coil 5. However, the work of winding a coil wire (enameled wire or resin-coated wire) of about 100 $\mu$m in wire diameter in the small hole 3 of about 1$\phi$ is difficult for a robot to perform, and must be achieved manually.

However, when carrying out the winding work manually, a deviation of the tensile strength or winding of a wrong number of turns tends to occur, a uniform magnetic flux distribution cannot be obtained in each product, and a deviation tends to occur in measurement accuracy. Further, because the winding work is carried out manually, the production cost is considerably increased.

SUMMARY OF THE INVENTION

With a view toward eliminating such prior art problems, a primary object of the present invention is to provide a magnetostrictive sensor structure which is remarkably improved in sensitivity and accuracy.

In addition to the improvement in sensitivity and accuracy, another of the present invention is to provide a magnetostrictive sensor structure in which coil winding can be easily achieved by a robot rather than manually, thereby considerably reducing the production cost and providing improved product quality and measurement accuracy.

In accordance with the present invention, which attains the above object, there is provided a magnetostrictive sensor comprising a wire-wound excitation coil and an output coil, disposed perpendicular to each other, at the center of a thin plate made of a magnetostrictive material. When drawing two virtual lines from the crossing center of the two coils in directions of 45 degrees to the right and left relative to the winding direction of the excitation coil, at least one edge, or preferably both edges, of upper and lower edge areas between the two virtual lines of the thin plate are cut out to form notches.

In this case, preferably, the notches are located between the two virtual lines (at the excitation coil side) without contacting the virtual lines at any positions.

Further, preferably, the excitation coil is formed by winding the coil wire utilizing the notches formed across the crossing center of the two coils.

With this construction, the sensitivity and accuracy of the sensor can be remarkably improved.

There is also provided according to the present invention, another aspect of a magnetostrictive sensor comprising a wire-wound excitation coil and an output coil, disposed perpendicular to each other, at the center of a thin plate made of a magnetostrictive material. When drawing two virtual lines from the crossing center of the two coils in directions of 45 degrees to the right and left relative to the winding direction of the excitation coil, both upper and lower edge areas between the two virtual lines of the thin plate are cut out to form notches, such that no sides of the notches contact the virtual lines. Further a coil wire is wound utilizing the pairs of notches opposing across the crossing center of the two coils to form the excitation coil and the output coil.

In this case, preferably, the notches are formed in nearly trapezoidal or tapered-form decreasing in width towards the crossing center of the two coils. Further the width of the coil winding parts of the notches is preferably set so as to allow winding of a plurality of turns.

With this construction, the sensitivity and accuracy of the sensor can be remarkably improved, and winding of the coils is easily achieved by a robot rather than by manual winding. This thereby considerably reduces the production cost and improves the product quality and measurement accuracy.

In the present invention, these magnetostrictive sensors structures are provided in the shackle pin, trunnion shaft, and other shaft members applied with the load of the vehicle, wherein the thin plate of the magnetostrictive sensor structure is held at an appropriate position of an inner peripheral surface of a cylindrical holder, and a retaining position of the cylindrical holder and the thin plate is set in the vicinity of the cross point of the two virtual lines and the edges of the thin plate.

With this construction, a strain can be optimally detected when applied in a load measuring apparatus for a vehicle.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Embodiments of the present invention will now be described with reference to the drawings.

However, it should be understood that the detailed description and specific examples, while indicating preferred embodiments of the invention, are given by way of illustration only, since dimensions, materials, shapes, and relative layouts of various members included in the embodiments, unless otherwise specified, are not limitative of the invention.

Figure 1:
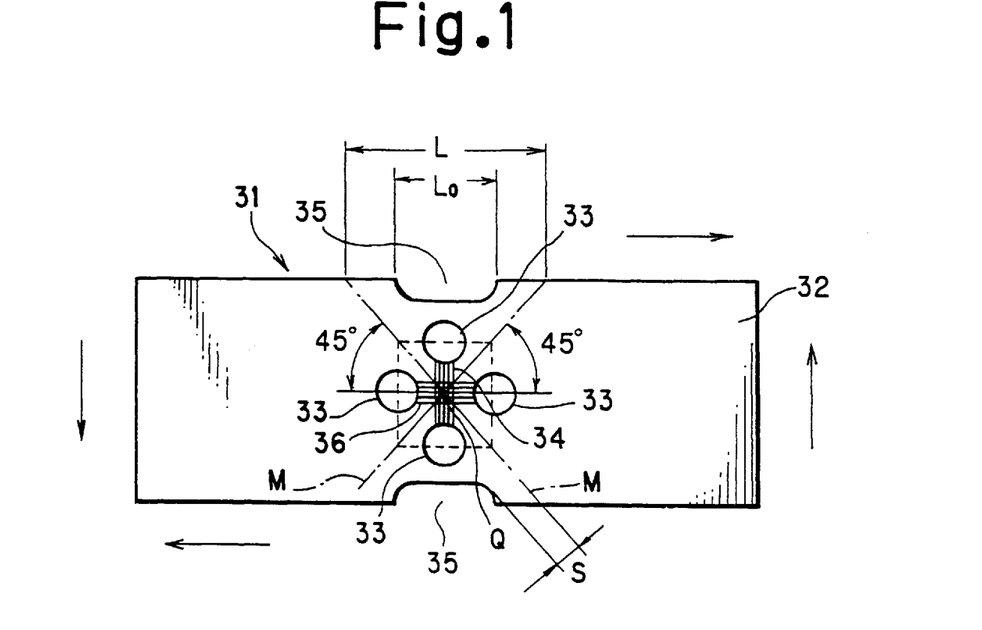
FIG. 1 is a schematic view for explaining the shape of a first embodiment of a first aspect of the magnetostrictive sensor structure according to the present invention.

FIG. 1 shows a magnetostrictive sensor structure 31 according to an embodiment of the first invention. As shown in the Figure, four small holes 33 are provided in cross directions at the center of a rectangular thin plate made of a ferromagnetic material such as a permalloy, two virtual lines M are drawn from the crossing center in directions of 45 degrees to the right and left relative to the winding direction of an excitation coil 34. Upper and lower edges of the thin plate are cut out in a flat U-shaped form, symmetrical to each other, thus forming a pair of notches 35.

Where a length of the edge of the thin plate 10 between the two virtual lines M drawn in 45-degree directions through the cross point is L, the notches 35 may be provided so that a width Lo of the notch 15 satisfies the following Formula (1). Further a distance S between a tangential line parallel to the virtual line M passing through the bottom corner of the notch 15 and the virtual line M satisfies the following Formula (2), and the shape is not specifically limited.

$$Lo \leq L \quad (1)$$

$$S > 2 \text{ preferably } S \geq 1 \text{ mm} \quad (2)$$

A coil wire is wound in cross directions, vertical and horizontal, through the four holes 33 to form the excitation coil 34 and an output coil 36 so that they are positioned in directions 45 degrees relative to the force acting direction.

Figure 14:
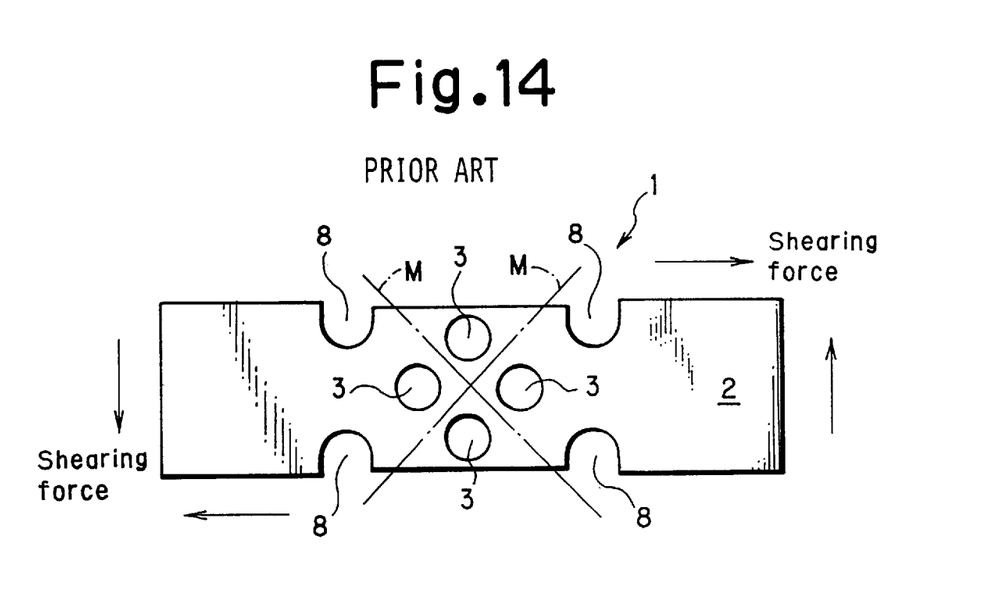
FIG. 14 is a schematic view showing the shape of a prior art magnetostrictive sensor structure.

A prior art magnetostrictive sensor structure 1 having U-shaped notches provided on the upper and lower edges outside the virtual lines M is shown in FIG. 14 and the magnetostrictive sensor structure 31 of the present invention provided with flattened U-shaped notches, symmetrically on the upper and lower edges inside the virtual lines M as shown in FIG. 1, are tested for shearing strain distribution of the thin plate 2 and the thin plate 32 when a shearing force is applied in the direction shown by the arrow by means of a finite element analysis method. Main stress distribution diagrams shown FIG. 3 and FIG. 4 are thus obtained.

Figure 4:
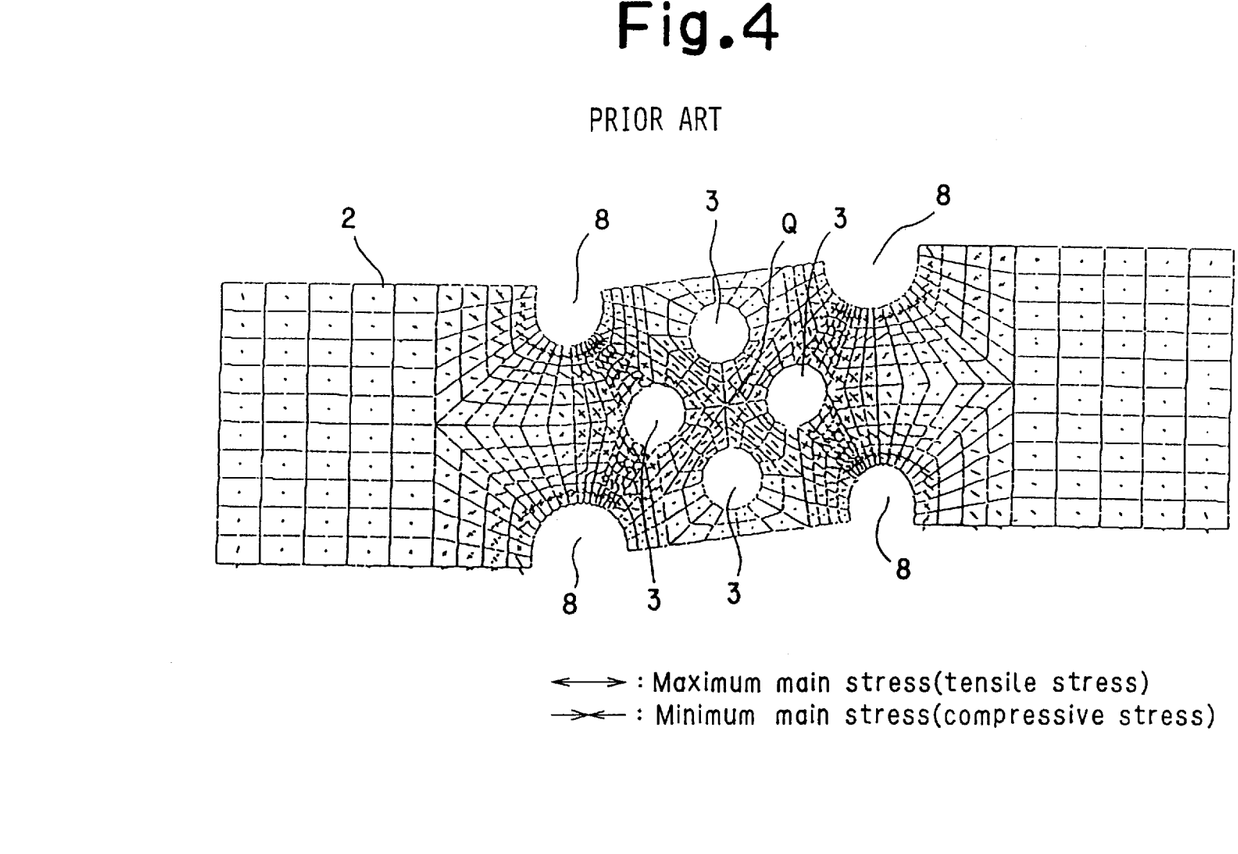
FIG. 4 is a main stress distribution diagram of a prior art thin plate shown in FIG. 14 when a shearing force is applied in a direction shown by the arrow, measured by a finite element analysis method using a computer.

As can be seen from the Figures, in the prior art magnetostrictive sensor structure 1 shown in FIG. 4, since the notches are located outside the virtual lines M, the notches 8 are deformed. The shearing strain is dispersed in each of the U-shaped notches 8 and, as a result, the strain deformation to the coil crossing center Q area of the coils is decreased.

On the other hand, in the magnetostrictive sensor structure 31 of the present invention shown in FIG. 3, since the notches are positioned inside the virtual lines M and preferably symmetrically across the coil crossing center Q, transmission of shearing strain to the magnetic material of the excitation coil 34 is concentrated in the coil crossing center Q area. Further the shearing strain is transmitted directly to the magnetic material of the excitation coil 34, thus remarkably improving the sensitivity.

Due to the concentration of transmission of shearing strain in the coil crossing center Q area, the strain detection ability of the magnetostrictive sensor structure 31 is improved, in addition to the sensitivity, and is stabilized. This thereby improves the S/N ratio to noise and accuracy.

Figure 2:
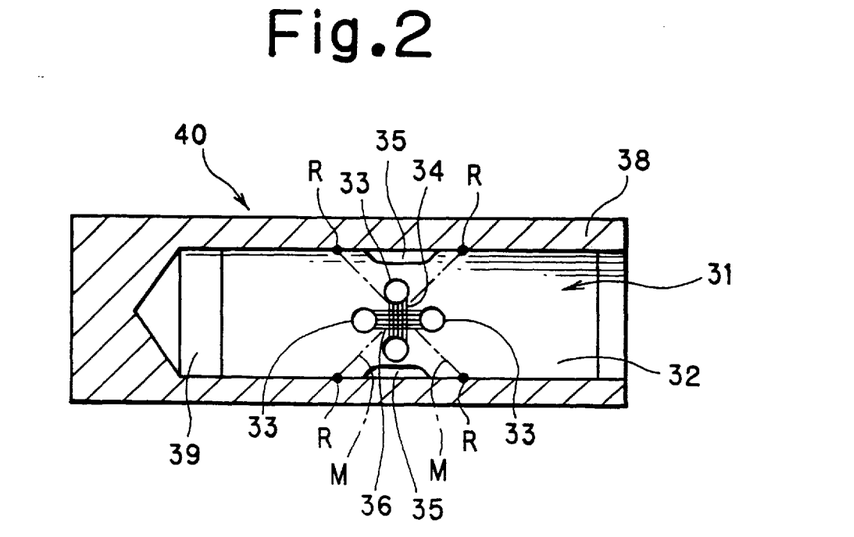
FIG. 2 is a schematic view for explaining a magnetostrictive sensor using the magnetostrictive sensor structure.

The thus constructed magnetostrictive sensor structure 31, as shown in FIG. 2, is incorporated in a sensor holding space 39 in a cylindrical holder 38, and the cylindrical holder 38 and the thin plate 32 are retained by spot welding to form a magnetostrictive sensor 40. In this case, a retaining position R of the cylindrical holder 38 with the thin plate 32 is set at the cross point of the two virtual lines M and the tangential line of the thin plate 32 or in its vicinity.

The cylindrical holder 38 is made of a uniform round rod material provided with a hole of a predetermined depth by end mill machining from one end face to form the circular hollow sensor holding space 39 with one end closed. However, it is not limited to this, and an ordinary hollow pipe may be used for example.

Figure 5:
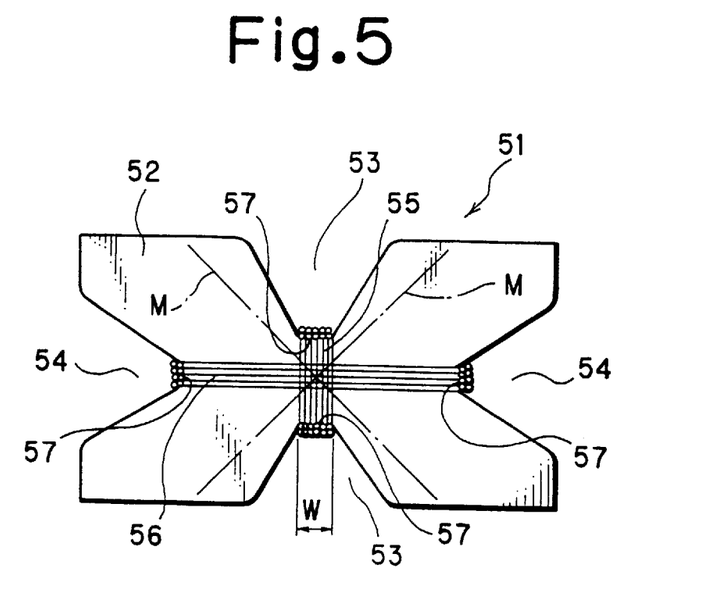
FIG. 5 is a schematic view showing the shape of a second embodiment of a second aspect of the magnetostrictive sensor structure.

FIG. 5 shows the magnetostrictive sensor structure 31 according to an embodiment of the second invention. As shown in the Figure, similarly to the above-described embodiment, two virtual lines M are drawn through the center of a rectangular thin plate 52 made of a ferromagnetic material such as a permalloy. Upper and lower and right and left edges of the thin plate 52 between the two virtual lines M are cut out to form notches 53 and 54 so that any edge line of the notches does not contact any of the virtual lines. Of the notches 53 and 54, a coil wire is wound utilizing the bottom of the pairs of the notches 53 and 54 opposing each other across the crossing center to form an excitation coil 55 and an output coil 56.

Figure 6:
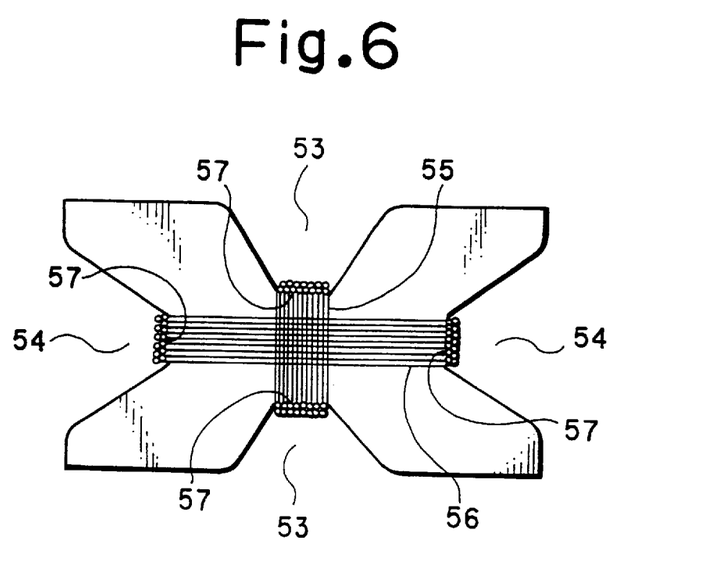
FIG. 6 is a schematic view showing the shape of another embodiment of the second aspect of the magnetostrictive sensor structure.

The notches 53 and 54 may be shaped to have a smoothly R-shaped bottom surface (curved face) 57 or flat V-shaped or U-shaped form. Or, as shown in FIG. 6, the notches 53 and 54 may be trapezoidally formed with corners of the bottom surfaces 57 formed to a small R.

The bottom surface 57 is set to have a coil wire winding width of the bottom surface 57 of the notches 53 and 54 of 0.5 to 2 mm so that the coil wire can be regularly wound in a plurality of turns and preferably chamfered to prevent the coil wire coating from peeling.

In the present embodiment, a coil wire of 100 $\mu$m in diameter (12–20 rows) is wound in two turns, totally 20–40 turns. With this construction, the coil wire can be simply wound utilizing the notches 53 and 54 disposed in cross directions of upper and lower and right and left directions. Therefore, it is not necessary to provide four holes in cross directions; coil winding can be easily achieved by an unattended robot; problems in production such as deviation of coil winding tension and incorrect winding turns can be eliminated; and consistent product quality and reduced deviation in measuring accuracy can be assured.

With the provision of the notches in cross directions, the functions and effects of the first invention can be even further amplified, providing a structure which efficiently senses a shearing deformation, thereby considerably improving the sensitivity.

The thus constructed magnetostrictive sensor structure 51, similarly to the magnetostrictive sensor structure shown in FIG. 2, is incorporated in the sensor holding space 39 in the cylindrical holder 38, and the cylindrical holder 38 and the thin plate 52 are retained by spot welding to form a magnetostrictive sensor. In this case, the retaining position R of the cylindrical holder 38 with the thin plate 52 is set in the vicinity of the cross point of the two virtual lines M and the tangential line of the thin plate 52.

The magnetostrictive sensor 40 having the above-described magnetostrictive sensor structure 31 (51) is used often used in trucks of so-called tandem-axle structure, which is often used in the rear axle of heavy trucks and rough-road trucks, in which two axles are used to reduce the pressure to the road surface, for example, as shown in FIG. 13. That is, in a tandem-axle structured truck, at the rear axle 21 side, a shaft hole 26 is provided along the axial direction in a trunnion shaft 23 engaged in a trunnion bracket 22 mounted on a bed frame 14. The cylindrical holder 38 of the magnetostrictive sensor 40 is inserted into the shaft hole 26, and the magnetostrictive sensor structure 31 (51) is thus engaged in the trunnion shaft 23.

Figure 7:
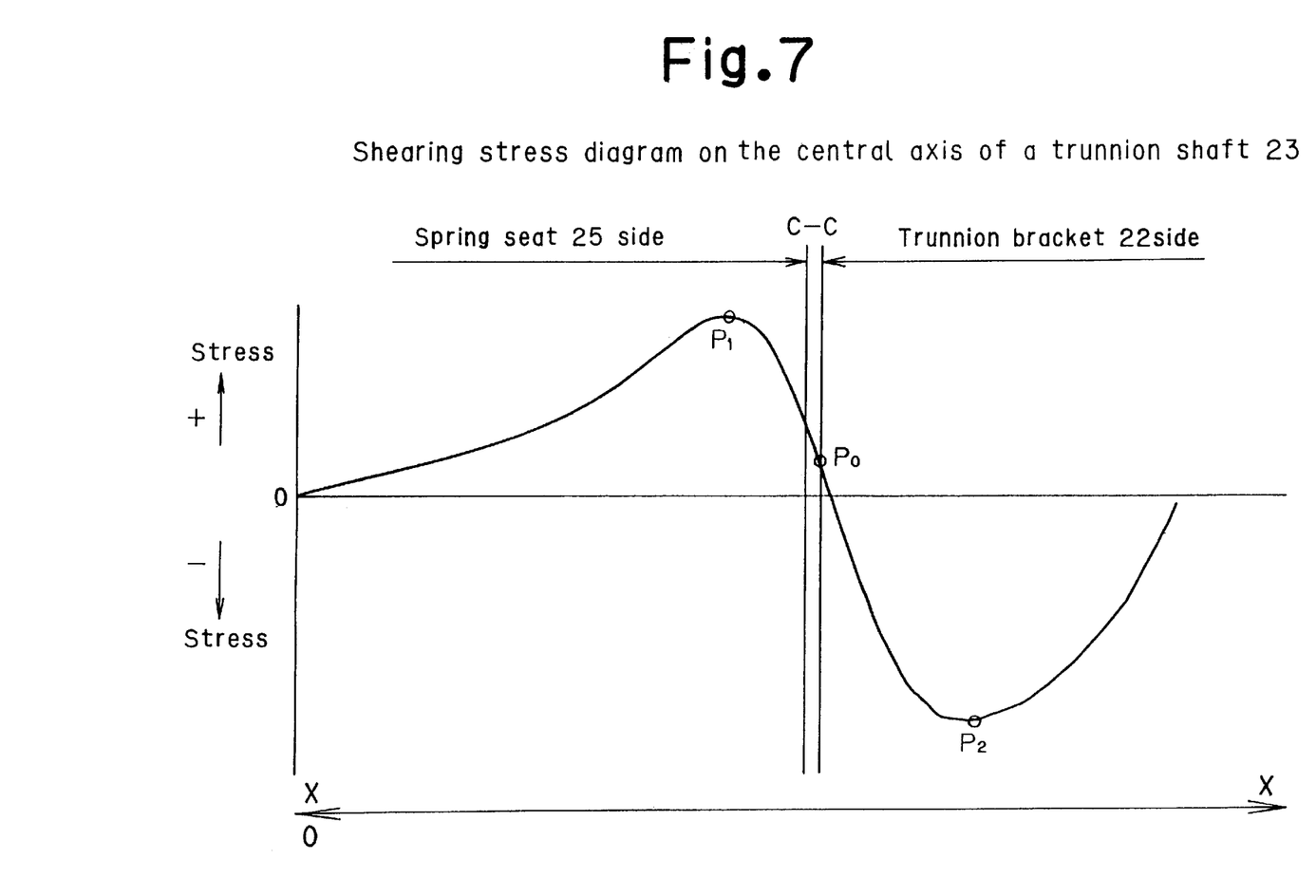
FIG. 7 is a shearing stress diagram on the central axis of a trunnion shaft.

In this case, the magnetostrictive sensor 40 having the magnetostrictive sensor structure 31 (51) is disposed to be shifted by a predetermined distance in an axial direction X—X from a shaft-crossing plane C—C of the trunnion shaft 23 passing through the end surface of the trunnion bracket 22. For example, the magnetostrictive sensor 40 having the magnetostrictive sensor structure 31 (51) is preferably disposed at a position which nearly corresponds to a maximum stress area ($P_1$, $P_2$) of the shearing stress diagram on the axial line of the shaft hole 26 shown in FIG. 7. A reference point 0 on the axis of abscissa in FIG. 7 is set at a predetermined position at the spring seat 25 side shown in FIG. 13.

Specifically, as shown in FIG. 13, on the center line of the trunnion shaft 23 which is in line with the axial line of the shaft hole 26, the maximum stress area of the shearing stress diagram is at point $P_1$ and point $P_2$ out of the end surface of the trunnion bracket 22. The point $P_1$ or $P_2$ is disposed at the cross point of the center line and a deflected line which is deflected by 30 to 60 degrees, preferably 40 to 50 degrees, and more preferably approximately 45 degrees, in the axial direction to the perpendicular crossing plane of the shaft hole 26 of the trunnion shaft 23 from the load fulcrum $C_p$ located on the cross point of the outer periphery of the shaft hole 26 of the trunnion shaft 23 and the end surface of the trunnion bracket 22.

Further, at the front axle 11 side of the vehicle, a shaft hole 18 is provided along the axial direction in the shackle pin 17 linking the leaf spring 13 side of the suspension 12 of the vehicle with the bracket 15 mounted on the bed frame 14. The cylindrical holder 38 of the magnetostrictive sensor 40 is inserted in the shaft hole 18, and the magnetostrictive sensor structure 31 (51) is engaged in the shackle pin 17.

Figure 8:
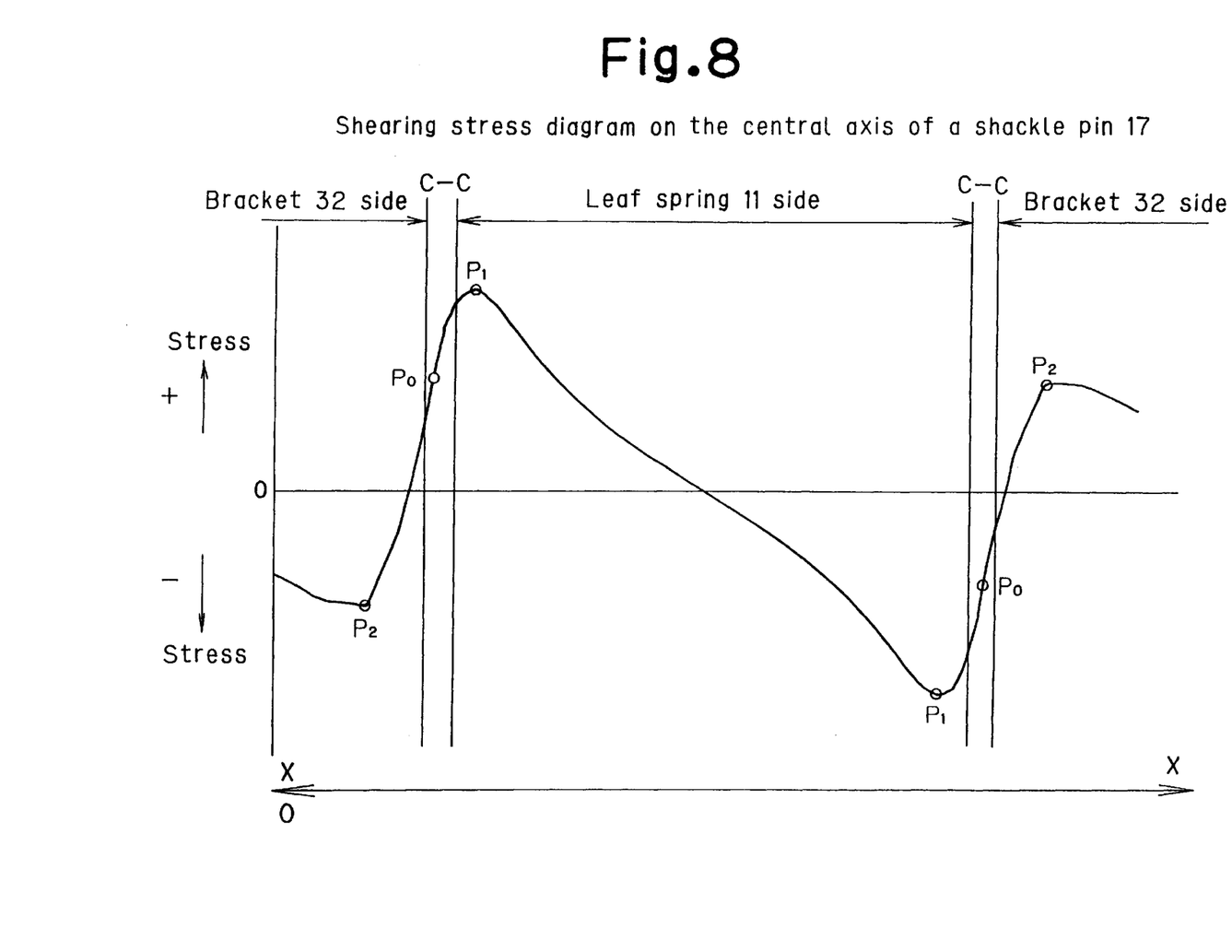
FIG. 8 is a shearing stress diagram on the central axis of a shackle pin.

The magnetostrictive sensor 40 having the magnetostrictive sensor structure 31 (51) is preferably disposed at a position shifted by a predetermined distance in the axial direction X—X from the shaft crossing plane C—C of the shackle pin 17 passing through the end surface in the bracket 15, so that the sensor 1 is disposed at a position nearly corresponding to the maximum stress area of the shearing stress diagram on the axial line of the shaft hole 18 as shown in FIG. 8.

That is, as shown in FIG. 8, on the center axis of the shackle pin 17 which is in line with the axial line of the shaft hole 18, the maximum stress area of the shearing stress diagram is at point P1 and point P2 out of the end surface in the bracket 15. Therefore, the sensor is preferably disposed at point $P_1$ or $P_2$ located at the cross point of the center line and a deflected line which is deflected by an angle θ (15 to 35 degrees) in the axial direction to the perpendicular crossing plane of the end surface of the bracket 15 of the shackle pin 17. The reference point 0 on the axis of the abscissa in FIG. 8 is set at a predetermined position at the bracket 15 side shown in FIG. 13.

In the above-described first invention, since the notches are disposed inside the virtual lines and symmetrically about the coil cross center Q area, transmission of shearing strain to the magnetic material of the excitation coil is concentrated in the coil cross center Q area. Further the shearing strain is transmitted directly to the magnetic material of the excitation coil, thereby remarkably improving the sensitivity.

Concentration of shearing strain transmission in the coil cross center Q area improves and stabilizes the sensitivity and strain detection ability of the sensor, and improves S/N ratio to noise and accuracy.

In the second invention, since the coil wire can be simply wound utilizing the notches disposed in cross directions of upper and lower and right and left directions, it is not required to provide four holes in cross directions. Thus, coil winding can be easily automated by a robot; problems in production such as deviation of coil winding tension and incorrect winding turns can be eliminated; and consistent product quality and reduced deviation in measuring accuracy can be assured.

Provision of the notches in cross directions even further amplifies the functions and effects of the first invention, and enables a structure which efficiently receives shearing deformation, thereby considerably improving the sensitivity.

Even when the thin plate having such notches is used as a sensor element member, the construction enables measurement of improved accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A magnetostrictive sensor structure for a magnetostrictive sensor, comprising:
   a thin plate made of a magnetostrictive material;
   a wire-wound excitation coil; and
   an output coil, disposed perpendicular to the wire-wound excitation coil, wherein the wire-wound excitation coil and the output coil are formed at the center of the thin plate,
   wherein, when drawing two virtual lines from the crossing center of the two coils in directions 45 degrees to the right and 45 degrees to the left relative to the winding direction of the excitation coil such that both of the two virtual lines intersect with an upper edge and a lower edge of the thin plate to form an upper edge area and a lower edge area, at least one edge of at least one of the upper and lower edge areas is cut out to form at least one notch.

2. The magnetostrictive sensor structure of claim 1, wherein said at least one notch is located between the two virtual lines (at the wire-wound excitation coil side), without contacting the virtual lines at any position.

3. The magnetostrictive sensor structure of claim 1, wherein said wire-wound excitation coil is formed by winding coil wire utilizing the at least one notch formed across the crossing center of the coils.

4. A magnetostrictive sensor structure used in a magnetostrictive sensor, comprising:
   a thin plate made of a magnetostrictive material;
   a wire-wound excitation coil; and
   an output coil, disposed perpendicular to the wire-wound excitation coil, wherein the wire-wound excitation coil and the output coil are formed at the center of the thin plate,
   wherein, when drawing two virtual lines from the crossing center of the two coils in directions 45 degrees to the right and 45 degrees to the left relative to the winding direction of the excitation coil such that both of the two virtual lines intersect with an upper edge and a lower edge of the thin plate to form an upper edge area and a lower edge area, both of upper and lower edge areas are cut out to form notches, such that none of the sides of the notches contact the virtual lines, and
   a coil wire is wound utilizing opposing ones of said notches across the crossing center of the coils to form said excitation coil and said output coil.

5. The magnetostrictive sensor structure of claim 4, wherein said notches are formed in nearly trapezoidal or tapered-form decreasing in width towards the crossing center of said coils, and wherein the width of the coil winding portions of the notches is set so as to allow winding of a plurality of turns.

6. The magnetostrictive sensor structure of claim 1, wherein said structure is provided in a shackle pin, trunnion shaft, or other shaft member applied with the load of a vehicle, wherein said thin plate of said magnetostrictive sensor structure is held at an appropriate position of an inner peripheral surface of a cylindrical holder, and a retaining position of said cylindrical holder and said thin plate is set in the vicinity of the cross point of the two virtual lines and the edges of said thin plate.

7. The magnetostrictive sensor structure of claim 4, wherein said structure is provided in a shackle pin, trunnion shaft, or other shaft member applied with the load of a vehicle, wherein said thin plate of said magnetostrictive sensor structure is held at an appropriate position of an inner peripheral surface of a cylindrical holder, and a retaining position of said cylindrical holder and said thin plate is set in the vicinity of the cross point of the two virtual lines and the edges of said thin plate.

8. The magnetostrictive sensor structure of claim 1, wherein the notches are positioned symmetrically across the coil crossing center of the thin plate.

9. The magnetostrictive sensor structure of claim 4, wherein the notches are positioned symmetrically across the coil crossing center of the thin plate.

10. The magnetostrictive sensor structure of claim 1, wherein the magnetostrictive material is a ferromagnetic material including permalloy.

11. The magnetostrictive sensor structure of claim 4, wherein the magnetostrictive material is a ferromagnetic material including permalloy.

12. The magnetostrictive sensor structure of claim 6, wherein the structure is retained in the cylindrical holder by spot welding at the retaining position.

13. The magnetostrictive sensor structure of claim 7, wherein the structure is retained in the cylindrical holder by spot welding at the retaining position.

14. The magnetostrictive sensor structure of claim 6, wherein the structure is provided near a maximum stress area of the shackle pin, trunnion shaft, or other shaft member.

15. The magnetostrictive sensor structure of claim 7, wherein the structure is provided near a maximum stress area of the shackle pin, trunnion shaft, or other shaft member.

16. A magnetostrictive sensor structure for a magnetostrictive sensor, comprising:

a thin plate made of a magnetostrictive material;

a wire-wound excitation coil; and an output coil, disposed perpendicular to the wire-wound excitation coil, wherein the wire-wound excitation coil and the output coil are formed at the center of the thin plate, wherein, when drawing two virtual lines from the crossing center of the two coils in directions 45 degrees to the right and 45 degrees to the left relative to the winding direction of the excitation coil, a width of the thin plate between a portion of the upper edge area and the lower edge area is less than a width of the thin plate outside the upper edge area and the lower edge area.

17. The magnetostrictive sensor structure of claim 16, wherein at least one of the upper edge area and the lower edge area have an edge tapered toward the crossing center of the coils.

18. The magnetostrictive sensor structure of claim 16, wherein the magnetostrictive material is a ferromagnet including permalloy.

19. The magnetostrictive sensor structure of claim 16, wherein said structure is provided in a shackle pin, trunnion shaft, or other shaft member applied with the load of a vehicle, said thin plate of said magnetostrictive sensor structure is held at an appropriate position of an inner peripheral surface of a cylindrical holder, and a retaining position of said cylindrical holder and said thin plate is set in the vicinity of the cross point of the two virtual lines and the edges of said thin plate.

20. The magnetostrictive sensor structure of claim 19, wherein the structure is provided near a maximum stress area of the shackle pin, trunnion shaft, or other shaft member.

* * * * *